Aug. 10, 1926.
R. T. PIERCE
METER DIAL
Filed July 22, 1921
1,595,727
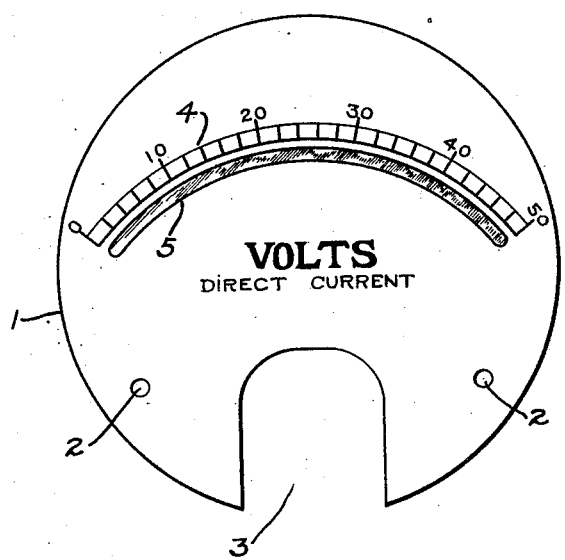
INVENTOR
Raymond T. Pierce.
BY
ATTORNEY
WITNESS:

Patented Aug. 10, 1926.

1,595,727

UNITED STATES PATENT OFFICE.

RAYMOND T. PIERCE, OF SWISSVALE, PENNSYLVANIA, ASSIGNOR TO WESTINGHOUSE ELECTRIC & MANUFACTURING COMPANY, A CORPORATION OF PENNSYLVANIA.

METER DIAL.

Application filed July 22, 1921. Serial No. 486,903.

My invention relates to meter dials and particularly to meter dials on which a reflecting or mirror-like surface is desired.

One object of my invention is to provide a meter dial that shall have a mirror-like surface strip or zone thereon to facilitate the reading of an instrument without recourse to the usual expedient of providing an ordinary glass mirror therefor, thereby rendering the instrument more economical to manufacture and less likely to damage by injury to the mirror.

Another object of my invention is to provide a meter dial having a top reflecting surface, in contradistinction to a glass mirror having a bottom reflecting surface, thereby avoiding errors caused by refraction in the relatively thick glass.

Heretofore, in order to facilitate the reading of certain electrical meters and other measuring instruments, it has been usual to provide glass mirrors adjacent to the graduated scales in order that reflections of the instrument pointers might be lined up, by eye, with the pointers. Instruments so provided with mirrors have been constructed in a variety of forms, such as having an arcuate glass mirror secured to the top surface of the dials or by having an arcuate opening or slot in the dial and a glass mirror therebehind. These instruments are relatively expensive and likely to be damaged.

Further, since glass mirrors are relatively thick and the reflecting or mirror surfaces are on the bottoms of the glass, slight errors of refraction, by which the pointer image may not be exactly on a line normal to the scale through the pointer, sometimes occur.

In practicing my invention, I provide a meter dial, preferably comprising a metal plate, that may be entirely or partially polished or plated and otherwise constructed to form a mirror-like reflecting-surface strip or zone, a graduated scale adjacent to the reflecting zone and legends or other markings as desired.

The single figure of the accompanying drawings is a front or face view of a meter or measuring-instrument dial embodying my invention.

In a preferred form, my invention may comprise a metal dial or plate 1, such as brass, having openings 2 or other means for attaching it to an instrument (not shown) and an opening 3 in which a pointer shaft or other parts of the instrument may be disposed. A graduated scale 4 and a strip or zone 5 of mirror-like reflecting surface are in adjacent parallel relation and of arcuate form about the axis of the meter shaft in the opening 3 for co-operation with a pointer.

In constructing the dial surface, the dial is preferably nickel plated and polished on its front surface, as viewed in the drawing, and a body of collodion, of the shape of the mirror strip 5, applied thereto. After this operation, the dial may then be dipped into the usual acid dip of the etching process to efface the reflecting surface, except that portion thereof that is disposed under the collodion coating. The scale 4 and other markings or legends may then be printed on the effaced surface or certain thereof may initially be formed under a collodion coating and formed during the etching process.

Another method of forming the dial is to print or impress a coating of enamel or other suitable material over all of the surface of the dial except that which it is desired to be of reflecting character. A further method of providing the dial with the mirror 5, whether the dial be of metal or other material, is to place thereon a relatively thin strip of reflecting material, such as silver leaf or tin foil, and securing it in position by pasting.

By any of the above described methods, or by a combination thereof, a meter dial having an integral or relatively thin top mirror surface portion may be constructed that is simple and durable in construction and economical in manufacture. Further, the error caused by refraction, as above mentioned, and the likelihood of damage, that a glass mirror is subject to, are eliminated.

While I have shown and described particular forms of my invention, changes may be effected therein without departing from the spirit and scope thereof, as set forth in the appended claims.

I claim as my invention:

1. A meter dial comprising a member having a scale surface and a non-refractive portion of mirror-reflecting character for co-operation with a pointer, the scale surface being at least as far from the pointer as the non-refractive portion.

2. A dial for an indicating instrument comprising a plate having scale characters marked on a surface thereof and a non-refracting mirror backed by said plate for co-operation with the movable element of the instrument.

3. A dial for an indicating instrument comprising a metal plate having a polished surface of mirror-reflecting character for co-operation with the movable element of the instrument and a treated surface constituting a scale area.

4. A dial for an indicating instrument comprising a metal plate having a polished surface of mirror-reflecting character for co-operation with the movable element of the instrument and an etched surface constituting a scale area.

5. A dial for an indicating instrument comprising a metal plate having a polished surface of mirror-reflecting character for co-operation with the movable element of the instrument and an etched surface defining the outline of the mirror surface.

6. A dial for an indicating instrument comprising a metal plate having a polished surface of mirror-reflecting character for co-operation with the movable element of the instrument and an etched surface defining the outline of the mirror surface and constituting a scale area.

In testimony whereof, I have hereunto subscribed my name this 11th day of July, 1921.

RAYMOND T. PIERCE.